(12) United States Patent
Smart et al.

(10) Patent No.: US 7,441,731 B2
(45) Date of Patent: Oct. 28, 2008

(54) SUPPORT BLOCK SYSTEM

(76) Inventors: Kenneth L. Smart, 14167 Oasis Rd., Caldwell, ID (US) 83607-7525; Terry K. Tidwell, 24860 Boise River Rd., Parma, ID (US) 83660

( * ) Notice: Subject to any disclaimer, the term of this patent is extended or adjusted under 35 U.S.C. 154(b) by 296 days.

(21) Appl. No.: 10/978,106

(22) Filed: Oct. 28, 2004

(65) Prior Publication Data

US 2006/0091265 A1    May 4, 2006

(51) Int. Cl.
*F16L 3/08* (2006.01)
*E04C 5/16* (2006.01)

(52) U.S. Cl. .................. 248/74.1; 52/677; 52/683; 52/684; 248/68.1

(58) Field of Classification Search .................. 248/49, 248/55, 68.1, 76.2, 76.4, 76.1, 62, 73, 74.1, 248/615; 249/144; 52/603, 604, 606, 608, 52/677, 675, 682, 687, 665, 683, 684; D25/138
See application file for complete search history.

(56) References Cited

U.S. PATENT DOCUMENTS

| | | | | |
|---|---|---|---|---|
| 2,893,669 | A | * | 7/1959 | Kndorf .................. 248/55 |
| 4,502,653 | A | | 3/1985 | Curtis, Jr. |
| 4,513,934 | A | | 4/1985 | Pruyne |
| 4,516,296 | A | * | 5/1985 | Sherman .................. 24/279 |
| 5,533,696 | A | | 7/1996 | Laughlin et al. |
| 5,729,949 | A | * | 3/1998 | Hartzheim .................. 52/677 |
| 5,855,342 | A | | 1/1999 | Hawkins et al. |
| 5,984,243 | A | * | 11/1999 | Pfaller et al. .................. 248/74.1 |
| D433,615 | S | | 11/2000 | Neider et al. |
| D436,422 | S | * | 1/2001 | Sartena .................. D28/92 |
| D436,522 | S | | 1/2001 | Neider et al. |
| 6,364,256 | B1 | | 4/2002 | Neider et al. |
| D466,393 | S | | 12/2002 | Neider et al. |
| D466,394 | S | | 12/2002 | Neider et al. |
| 6,502,791 | B2 | | 1/2003 | Parker |
| 6,520,456 | B1 | | 2/2003 | Neider et al. |
| 6,672,545 | B1 | | 1/2004 | Persing |
| 6,679,461 | B1 | | 1/2004 | Hawkins |
| D490,295 | S | | 5/2004 | Neider et al. |
| D496,058 | S | | 9/2004 | Sargent et al. |
| D498,133 | S | | 11/2004 | Sargent |
| D498,660 | S | | 11/2004 | Neider et al. |
| D498,661 | S | | 11/2004 | Neider et al. |
| 6,925,771 | B2 | * | 8/2005 | Lee et al. .................. 52/685 |
| 7,007,978 | B1 | * | 3/2006 | Purdom .................. 280/809 |
| D521,851 | S | * | 5/2006 | Smart .................. D8/354 |
| 7,168,210 | B2 | * | 1/2007 | Krovats .................. 52/167.9 |
| 2006/0091265 | A1 | * | 5/2006 | Smart .................. 248/49 |
| 2007/0022676 | A1 | * | 2/2007 | Krovats .................. 52/167.9 |
| 2007/0045482 | A1 | * | 3/2007 | Smart .................. 248/68.1 |

* cited by examiner

*Primary Examiner*—Brian Glessner
*Assistant Examiner*—Tan Le
(74) *Attorney, Agent, or Firm*—Stephen M. Nipper; Derek H. Maughan; Dykas, Shaver & Nipper, LLP

(57) ABSTRACT

A system and device for installing and mounting conduit upon a surface such as a roof. The system made up of at least one support block having a base and an upper portion, a support rail and a variety of attachments for holding conduit to the rail. Each of the various blocks in the system configured to nest when oriented in a first direction to stack in an elevated position having a greater height when oriented in a second direction. These pieces are configured to work together to provide a mounting system with significant advantages over other devices that exist in the prior art.

12 Claims, 9 Drawing Sheets

SUPPORT BLOCK SYSTEM

BACKGROUND OF THE INVENTION

1. Field of the Invention

The present invention generally relates to devices used in the installation and mounting of elongated tubular material such as pipes, conduit and wire over and across a surface, and more particularly to installation and mounting of such items upon a generally horizontally disposed surface such as a roof or floor.

2. Background Information

Many features of modern construction provide convenience by allowing a party to simply and easily access items from a distant location. Examples of such devices include plumbing, heating, ventilating and air conditioning systems. In many of these instances needed materials such as natural gas, electricity, water, and other items are transported from one location to another through a conduit. These conduits must be permanently attached in one location so as to support the conduit while preventing the conduit from being damaged or moved out of a desired alignment and position.

One of the ways in which this is done is through mounting devices that are mounted or secured in a desired location so as to support and maintain the stability of these devices. In mounting or securing such items there are several considerations that must be taken into account. Some of these considerations include: the weight of the pipes on the roof, the possible damage to the roof and the environmental considerations in which the system will be placed. Mounting systems must have sufficient strength so as to support a designated item in a desired position and orientation upon a roof. Mounting systems must also be of a material that will not cause damage to the roof or floor, or other surface that underlies the position wherein the mounting system is placed. If damage to the surface were to occur, for example in the instance of a roof, damage to the underlying roof could cause additional damage to the interior of the building.

Other considerations that must also be taken into account include providing a means for allowing the general slope of the conduit to be maintained and adjusted in such a way so as to allow the desired flow and positioning of materials through the transport tube. In some instances, such as those occurrences wherein a party is dealing with gravity fed drain lines, an appropriate slope must be accommodated so as to ensure the proper drainage of the pipes from a first location to a discharge area. In other modifications the general level of the pipe must be left level so as to ensure the appropriate rate of flow of materials through these devices. In other applications the appropriate positioning of the device is crucial to the protection and function of the conduits and the materials passed there through.

Another problem that occurs in the prior art is that the weight of the blocks that are placed upon the roof in order to ensure the stability of these conduits are many times burdensomely heavy and thus difficult and bulky for a user to move and install. Another feature that exists in the prior art is that some of the devices utilized in the prior art have inherent limitations because of their size and configurations and do not allow for the placement of multiple pipes or conduit to be run over a designated distance.

Various prior art systems have attempted to address these problems. However, each of these systems has had inherent problems associated with them. One system that is employed in the prior art utilizes the attachment of the tubing to wooden planks with unfinished metal clamps. This system has many limitations. One problem is that significant damage can be caused to the roofing material by wooden planks. This damage is incurred not only from the weight of materials but also by movement of the planks along the surface of the roof as the conduit connected thereto expands and contracts in response to various thermal conditions. Furthermore, in climates where the devices are exposed to water in various forms, the increased exposure to moisture causes the wood to rot and the unprotected metal to rust and therefore requires frequent replacement and repair. Another problem that exists in such an embodiment is that the wooden planks must be shimmed or cut in order to accommodate various height and slope requirements depending upon the conduit that is being mounted. This requires that an installer not only bring all of the bulky wooden pieces and the metal connection parts with him/her on to the roof, but that he/she also bring tools with them so that they can cut, modify and construct bracing of various heights so as to allow for the proper installation of the conduits upon the designated surface.

Therefore what is needed is an improved system for mounting and placing conduits and pipes upon a building structure. What is also needed is a system and device that allows for variable forms of flexibility with pieces that are easy to carry, simple to use and easy to install. What is also needed is a device that provides vertically and horizontally stable support elements connected to a connection device that allows for the placement of multiply variable conduits that are attached to support devices through simple means with limited use of tools. Accordingly, it is an object of the present invention to provide these items.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a system and device for installing and mounting conduit upon a surface such as a roof. The system is comprised of at least one support unit, such as a support block, that is configured to support at least one pipe. The support rail has a track and an adapter for connecting a piece of conduit to a support rail. These pieces are configured to work together to provide a mounting system with significant advantages over other devices that exist in the prior art.

The support block has a body with a base and an upper portion. The body of the support block is generally hollow and defines an internal cavity that is configured to receive an upper portion of another support block within the hollow body. In the preferred embodiment, this configuration is accomplished by providing a support block with a generally tapered configuration wherein the base covers a larger area than the upper portion. The upper portion further defines a channel positioned within an upper portion of the support unit. The channel of the device is then configured to receive a support rail therein.

The generally hollow support block is hollow and defines an internal cavity within the support block. The internal cavity is configured to receive an upper portion of a second support block. The internal cavity and the second support block are configured so that when a second support block is placed in a first orientation over a first support block, the first support block and the second support block nest together, with the second support block fitting inside of the first support block. These devices are also configured so that when the first support block is positioned in a second orientation over a second support block, the first and second support blocks do not nest but are positioned together in a generally stable vertically spaced orientation.

In the preferred embodiment, the support blocks are assisted in holding themselves in a generally vertically oriented position by generally vertically oriented ribs or projections that extend from the upper portion of the support block. These generally vertically oriented projections are configured to stabilize the support blocks when the support blocks are positioned in the previously described spaced stacked orientation. In the preferred embodiment, these support blocks also include at least one generally horizontally oriented projection. These generally vertically oriented projections are each configured to interact with an inner portion of a compatibly configured inner portion of another block so as to hold the vertical blocks in a stable, vertically spaced orientation.

These blocks are preferably made of a high-density UV resistant plastic material, such as ABS, polycarbonate, fiberglass mix or any other suitable material that achieves the necessary functions of the device. These devices prevent damage to the underlying roof surface, while at the same time having sufficient strength so as to support loads of up to 100 lbs. These blocks are also relatively lightweight, which allows a party utilizing the blocks to carry a stack of nested blocks together upon a roof for placement. While upon the roof, the blocks can be removed from their nested position and assembled and placed in a desired position and orientation. The support blocks of the present invention are so configured so that in the event that a block at a raised height is required, such an elevated block arrangement can be obtained by removing a first block from a nested position upon a second block and rotating the first block 90°, and then replacing the first block over the second block. Such a configuration allows for a rise of a predetermined vertical height adjustment and facilitates the ease and use of the device upon a roof or other designated surface.

In use, once the blocks are in place, a support rail is placed within the channel in the top portion of the support block, and various attachments may be inserted into the track portion of the portion rail. The conduit is then connected to or brought into contact with the various attachment devices and connected. Such a system provides a significant improvement over the prior art in that it eliminates the major disadvantages of the prior art system and devices that have been previously described and discussed.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
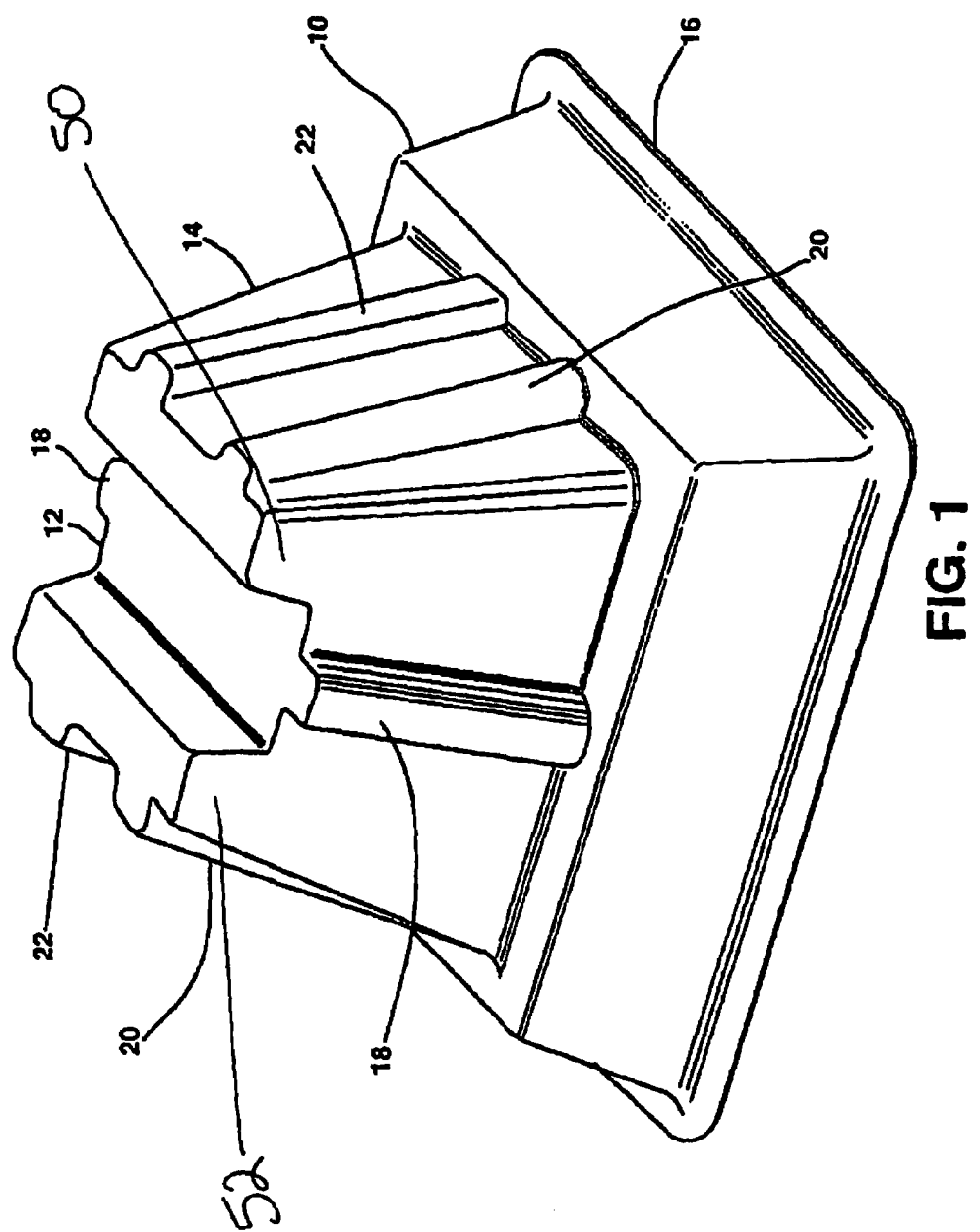
FIG. 1 is a perspective view of the support block described in the preferred embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a system for mounting pipes upon a building roof or structure. FIGS. 1-10 of the present invention show this preferred embodiment of the invention both together as well as in its individual pieces as they are described in the present invention. Referring first to FIG. 1, the support block 10 used in the present invention is shown. The support block 10 has a body (which is also 10), which includes an upper portion 14, a channel 12 and a base 16. The body 10 is generally hollow and defines an inner cavity that is compatibly configured to receive a second unit therein as is shown in FIGS. 2-5. This allows for the stacking of these support blocks 10 in varied configurations to achieve various desired results.

In the preferred embodiment, the support blocks are made of a high-density ABS plastic that is UV resistant and allows for maximum strength as well as resistance to wear. This also ensures that the devices are relatively lightweight and easy to carry. The nesting feature of the present invention allows multiple numbers of these devices to be carried in a stacked configuration thus allowing increased ease in transporting these devices from one location to another.

The support blocks 10 of the present embodiment also comprise a first set of projections or support ribs 18 that extend in a generally vertical orientation extending from just below the base along the upper portion 14. This first set of projections or support ribs 18 are configured to nest within compatibly configured portions of the hollow internal cavity of another compatibly configured support block 10. In the preferred embodiment, the body 10 is generally tapered as it extends from the base 16 to the top of the upper portion 14. This facilitates the ease of stacking the various devices one upon the other.

The preferred embodiment of the present invention also includes a second set of projections or support ribs 20 and a third set of projections or support ribs 22. These projections 18, 20 and 22 provide resistance and bracing against horizontal movement when two of the support bodies 10 are placed upon one another in a generally vertical orientation. The preferred embodiment of the present invention also includes at least one generally horizontally oriented projection (50, 52). These generally vertically oriented projections are each configured to interact with an inner portion of a compatibly configured inner portion of another block so as to hold the vertical blocks in a stable, vertically spaced orientation.

Figure 2:
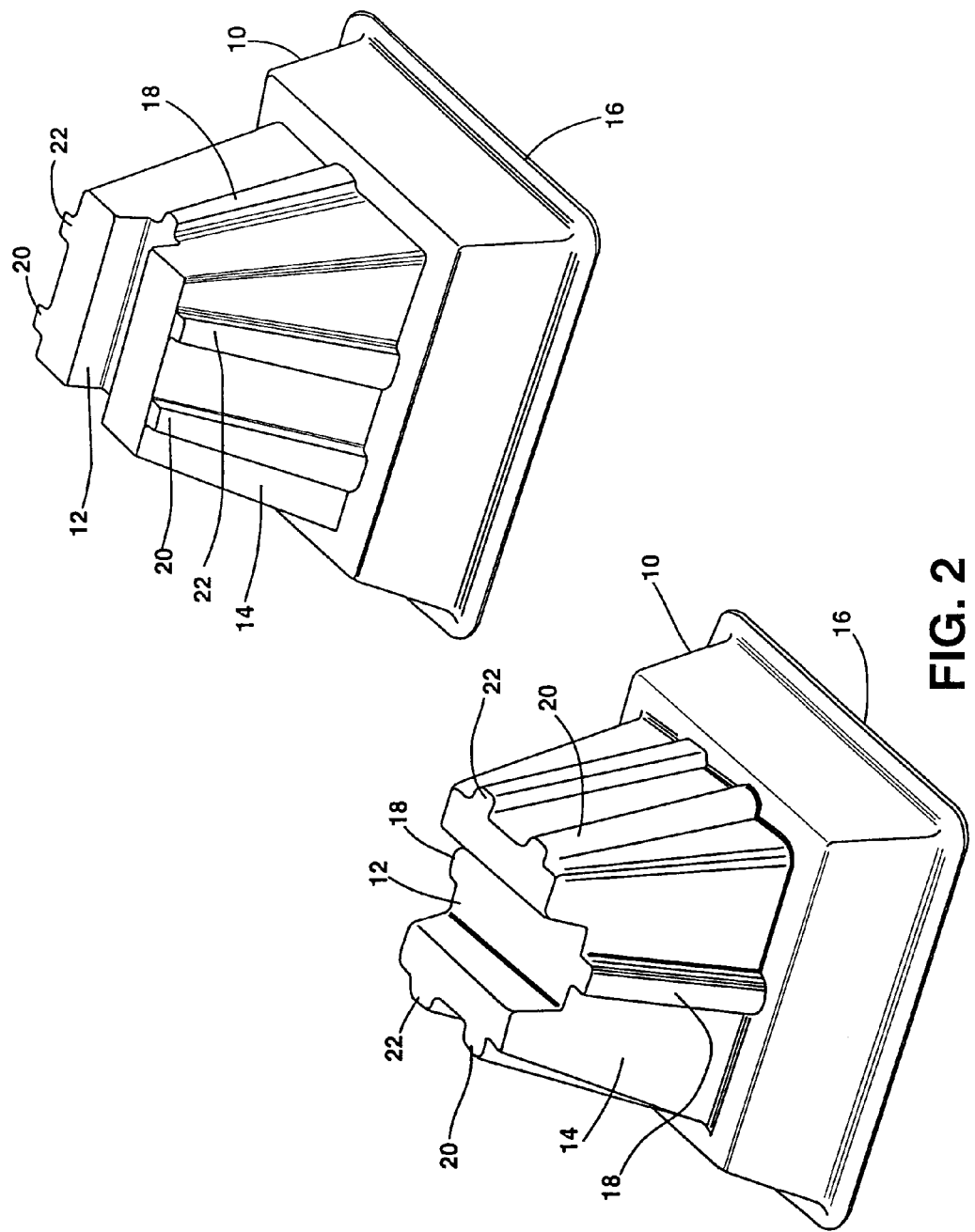
FIG. 2 is a perspective view of two of the support blocks of the present invention shown in varying orientations.

Referring now to FIG. 2, FIG. 2 shows two of the blocks 10 of the present embodiment. One is shown in a first orientation and the other in a second orientation. When the two devices are stacked one upon the other, they result in the generally vertically spaced stacking orientation shown in FIG. 3. In the preferred embodiment, the distance from the base 16 of the first device 10 to the base 16 of the second device 10' is approximately one half inch in the nested position, and a space of about two inches when these devices are stacked in the vertically spaced configuration. While these measurements are shown and described in the present embodiment, it is to be distinctly understood that the invention is not limited thereto but may be variously embodied to include a variety of other features and configurations. This ability allows a user to accommodate irregular roof surfaces by turning and stacking these support blocks thus moving them from a nested position (shown in FIG. 5) to this generally spaced orientation (shown in FIG. 3). This enables a user to progressively increase the height of these blocks 10 by simply utilizing the blocks themselves, and does not require the additional use of other spacing devices or shims as is taught in the prior art.

While additional spacing devices are not required, their use is similarly not prohibited by the use of the present invention. It is to be distinctly understood that the present invention does not exclude additional spacing devices such as shims from use with the present invention.

Figure 3:
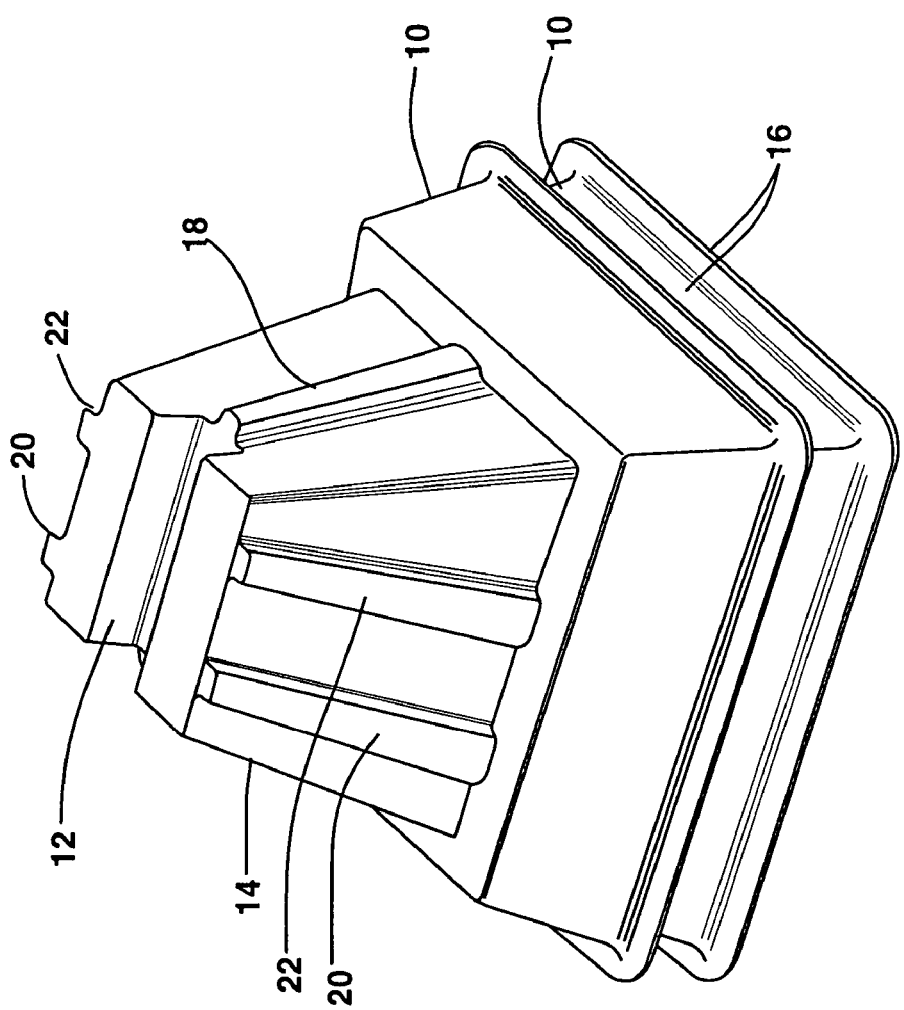
FIG. 3 is a perspective view of the support blocks of the present invention in a stacked, generally vertically spaced orientation.
Figure 4:
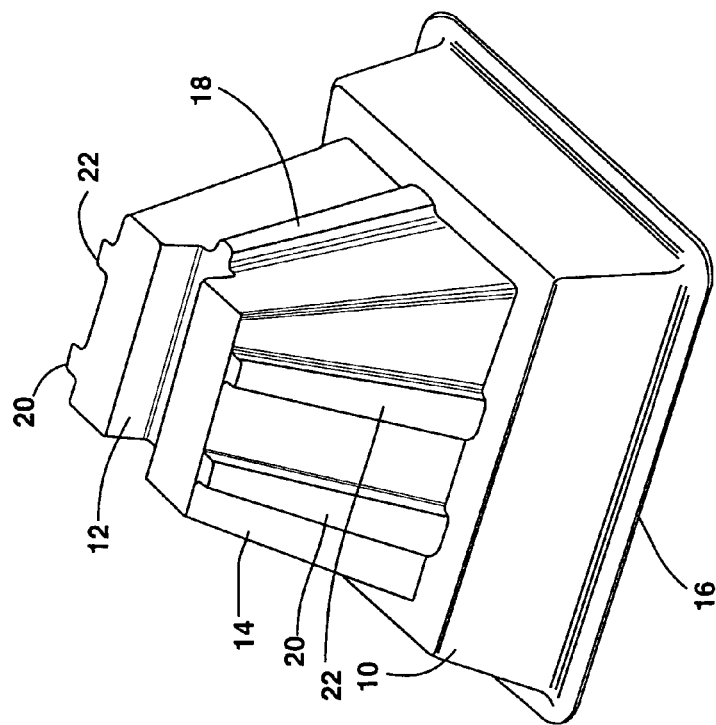
FIG. 4 is a perspective view of the support blocks of the present invention in the same general vertical orientation.
Figure 4:
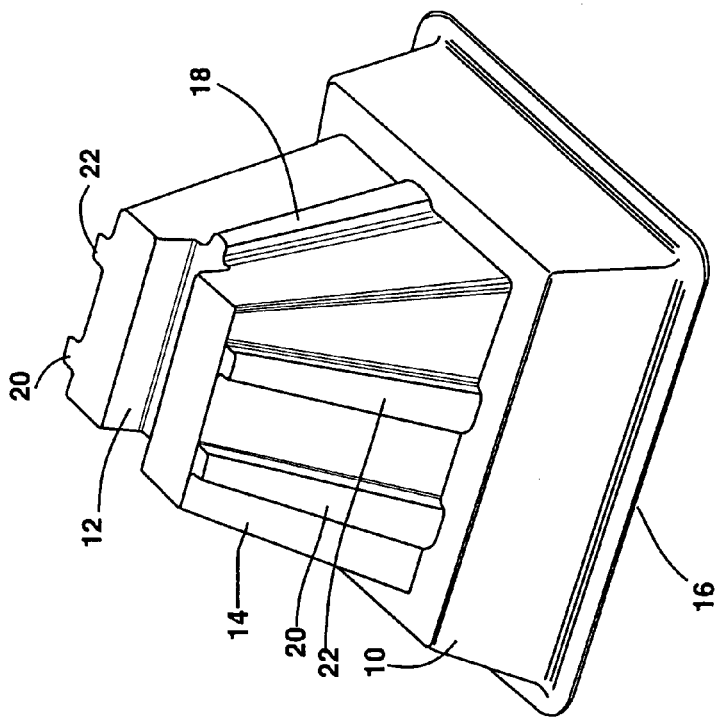
Figure 5:
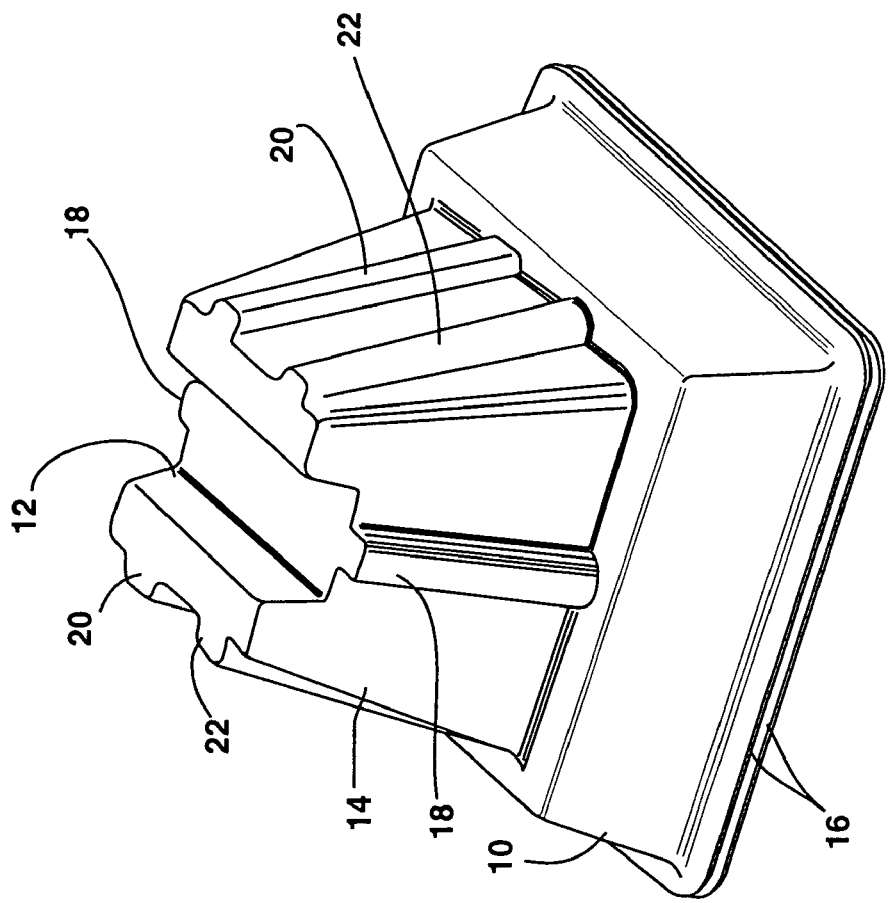
FIG. 5 is a perspective view of the preferred embodiment of the present invention in a stacked, nested orientation.

Referring now to FIG. 4, a view of two samples of the present invention is shown oriented in the same direction. These devices, when oriented in the same orientation and then stacked, result in a nesting configuration as shown in FIG. 5. This nesting stacked configuration allows multiple devices 10 to be stacked one on top of each other and carried from one location to another. When arriving at the second location, if an increase in height is necessary, this can be achieved by simply lifting the top block 10' from its nested position on top of a bottom block 10, rotating the block ninety degrees and replacing this top block 10' on top of the block beneath 10. When this occurs, the blocks 10, 10' are vertically stacked in a vertically spaced orientation as is shown in FIG. 3. This then allows the user to attach the remaining portions of the system 100 to the block 10, 10' as may be required.

Figure 6:
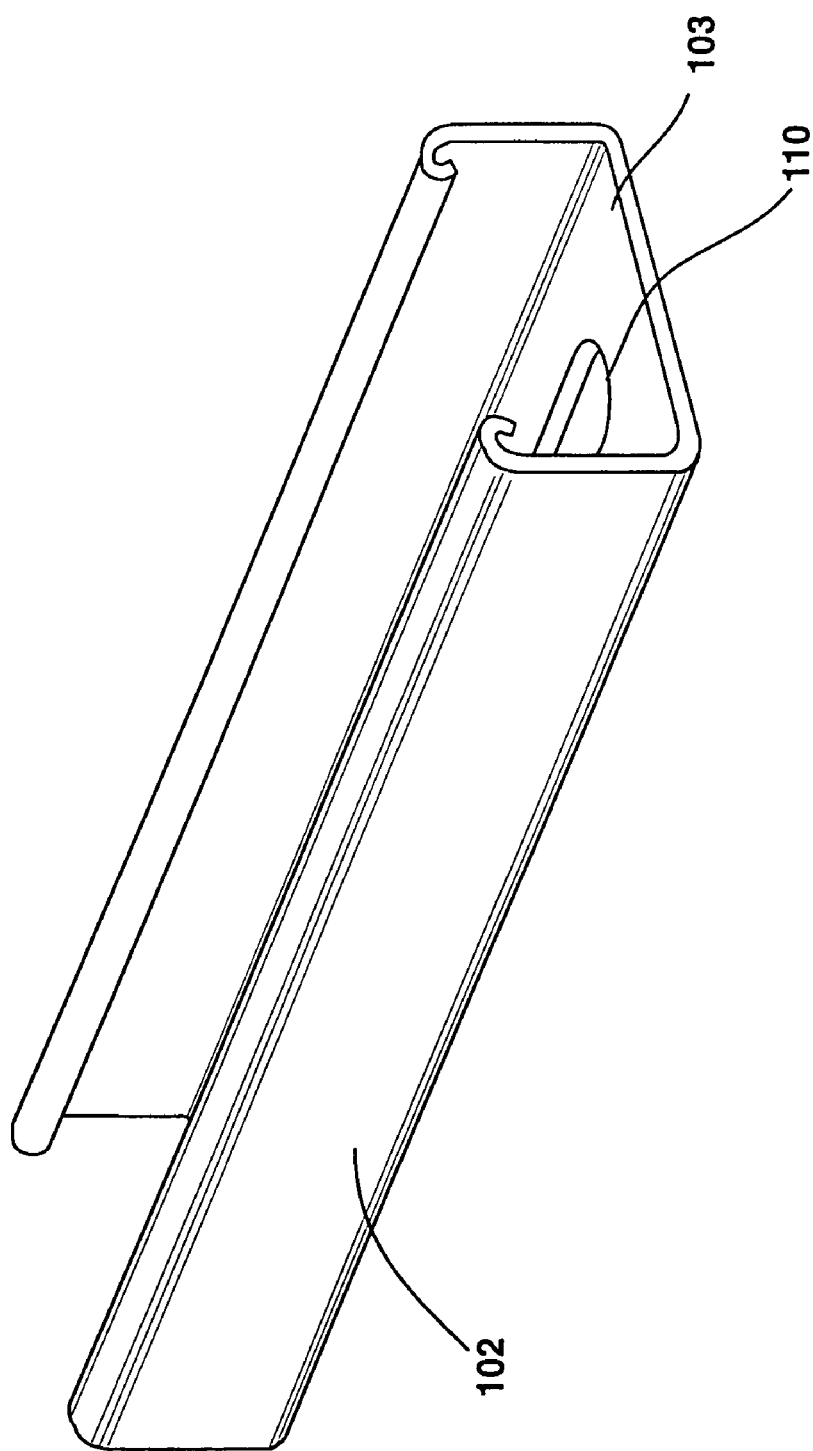
FIG. 6 is a perspective view of the rail and track described in the system of the present invention.

FIG. 6 shows a support rail 102 that defines a track 103 and which is configured to fit within the channel 12 of the support block body 10. When placed within this support block body 10, the track 103 may be utilized to span distances and extend outward and beyond the mounting block 10 itself. This provides a significant advantage in that rather than requiring a very large mounting block, as is shown in some of the prior art embodiments, the present invention can simply use two of the support blocks 10 and extend a track 103 to the desired length between these two devices so as to form a so called bridge that can then hold attachments connected thereto. This configuration allows the various pipes to be held in a desired mounting position. The support rail 102 has a track 103 which also defines apertures 110 or other means for permanently attaching the rail 102 to the support block 10 through a traditional fastening device such as a screw.

While this is described as the preferred embodiment of the invention, it is to be distinctly understood that the present invention is not limited thereto but may be variously embodied within the scope of the claims. Therefore, the limitation of the track 103, support block 10 and attachment means are intended to be merely illustrative in nature and not as restrictive. The system of the present invention further comprises various attachment devices (shown in FIGS. 7, 8, 8A and 9) that can be attached to the track 103 and the blocks 10 to hold the various pipes 120 in a desired orientation. While one size of this support rail is shown in FIG. 6, it is to be distinctly understood that the invention is not limited thereto but may be variously embodied to include a variety of other features and configurations depending upon the necessities of a user. These configurations include those situations where a single rail is generally centrally positioned over a single support block 10, as well as other instances where a rail 103 is bridged over a pair of support blocks 10.

Figure 7:
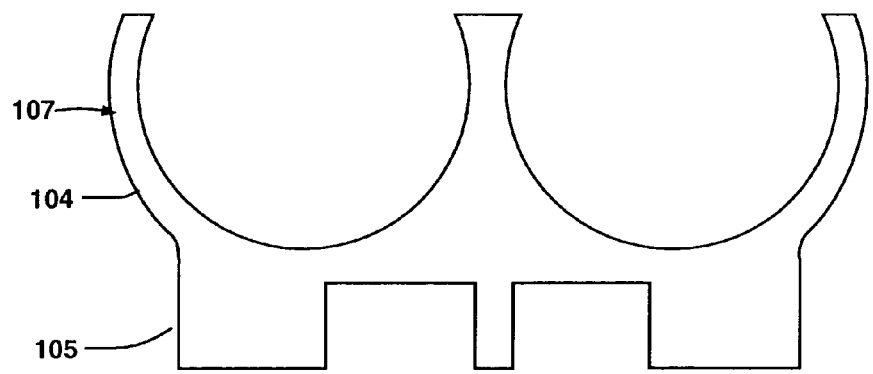
FIG. 7 is an end view of the attachment portion of the device described in the present invention.

FIG. 7 shows a removable adapter 104 that is configured to be placed within the track 103. In this preferred embodiment this connection is achieved by a "snap-in" connection. This snap-in connection is achieved by tabs that are configured to grasp a portion of the rail 102, and hold the adapter 104 in a desired position and orientation. The present invention also includes a stationary adapter 107 that is configured to hold a pipe 120 of a desired shape therein. These devices are configured so that the device can simply snap into these devices and be prevented from any vertical or horizontal movement while still allowing the pipe 120 to expand and contract in a longitudinal direction along the length of the pipe 120, which would be inserted therein.

Figure 8:
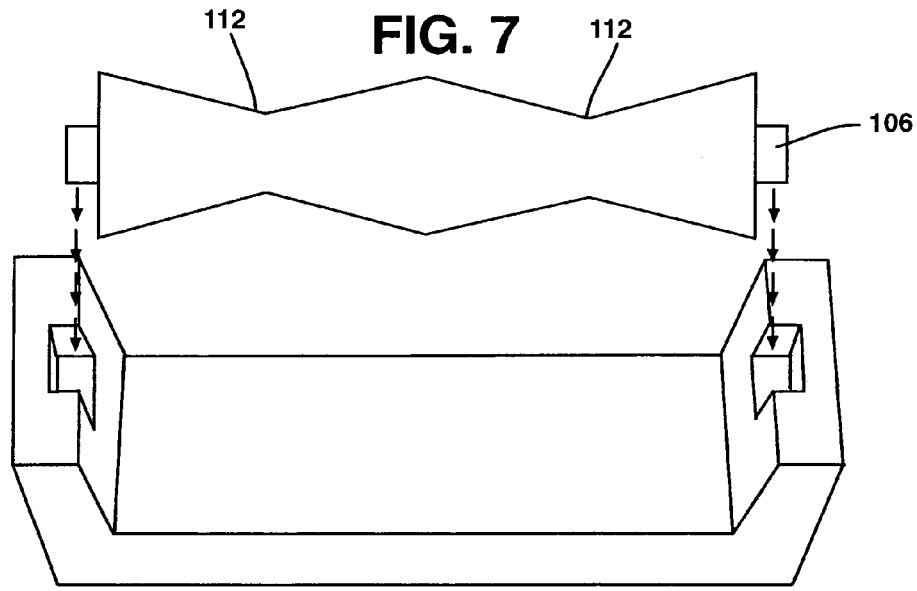
FIG. 8 is an end view of the attachment portion of the device described in the present invention.
Figure 8A:
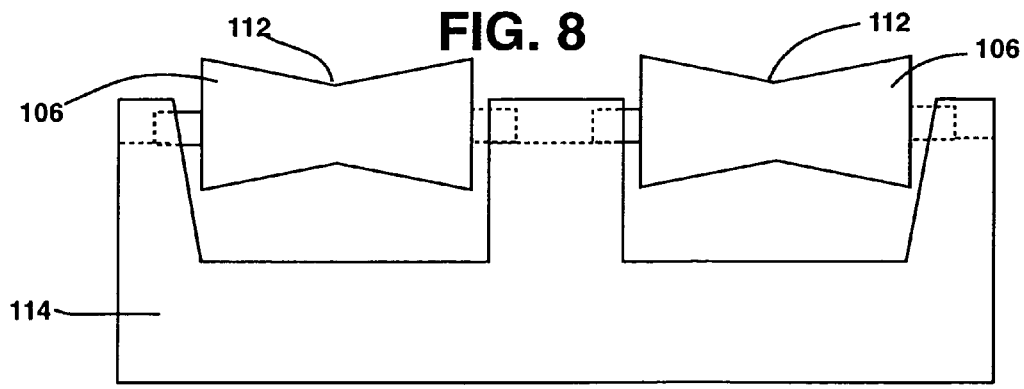
FIG. 8A is an end view of an alternative embodiment of the attachment device shown in FIG. 8.

Another embodiment of the present invention that shows a similar operation is shown in FIG. 8. FIG. 8 shows another adapter 104', which has a snap-in base 105 and a roller 106 which is configured for placement within the snap-in base 105. The roller 106 has a generally hourglass shape that allows for the placement of up to two pipes within the valleys 112, within the roller 106. In this embodiment, as the pipe moves, the roller simply rolls. However, the configuration of the device prevents the movement of the device in a vertical or horizontal orientation but allows the pipe to expand and contract in a generally longitudinal direction along the length of the pipe. FIG. 8A shows a similar configuration wherein a single hourglass shaped roller is rollingly connected to a more permanently affixed base. In addition to this embodiment a variety of other devices, shapes and configurations can also be utilized with the connection bases 105, 114, to connect and maintain pieces of material in a desired shape and orientation.

In addition to this embodiment, other variations of these attachment devices are also considered to be a part of the device. In other embodiments single hour glass pieces connected at a generally centrally positioned core may be utilized rather than the double hourglass configuration that is shown in FIG. 8.

Figure 9:
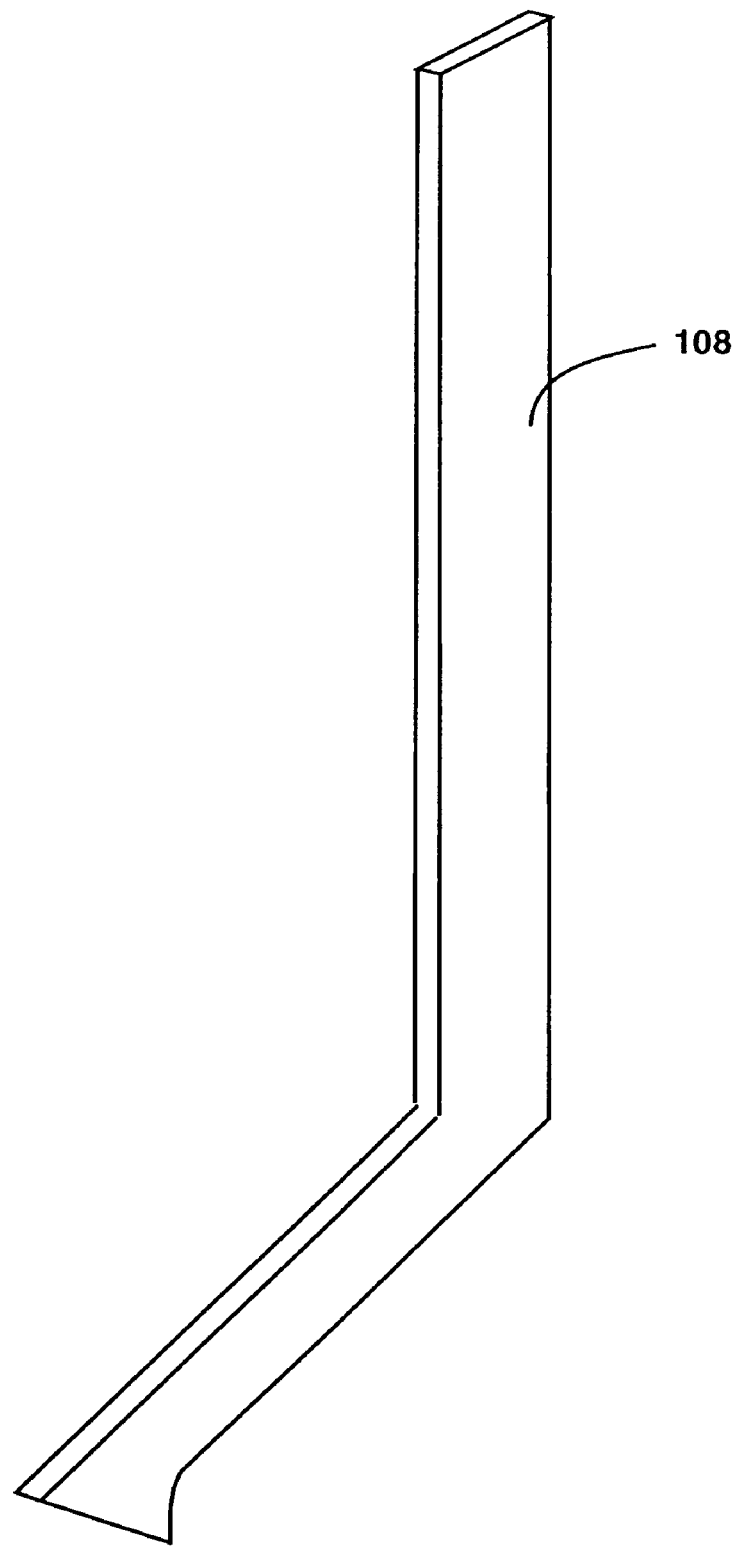
FIG. 9 is a perspective view of an adjustable height riser connection that can be used in the present system.

FIG. 9 shows a generally vertically oriented attachment device 108 which may be connected to the support block 10 so as to provide a vertically adjustable pipe connection device. Such a configuration is of particular assistance for use with a gravity dependent drain or other piece of conduit that requires the maintenance of a desired slope between two points. This vertical attachment device further allows a device to accommodate pieces of conduit and tubing that are oriented and arranged as various desired slopes and positions. An example of such a device is shown in FIG. 9 of the present embodiment.

Figure 10:
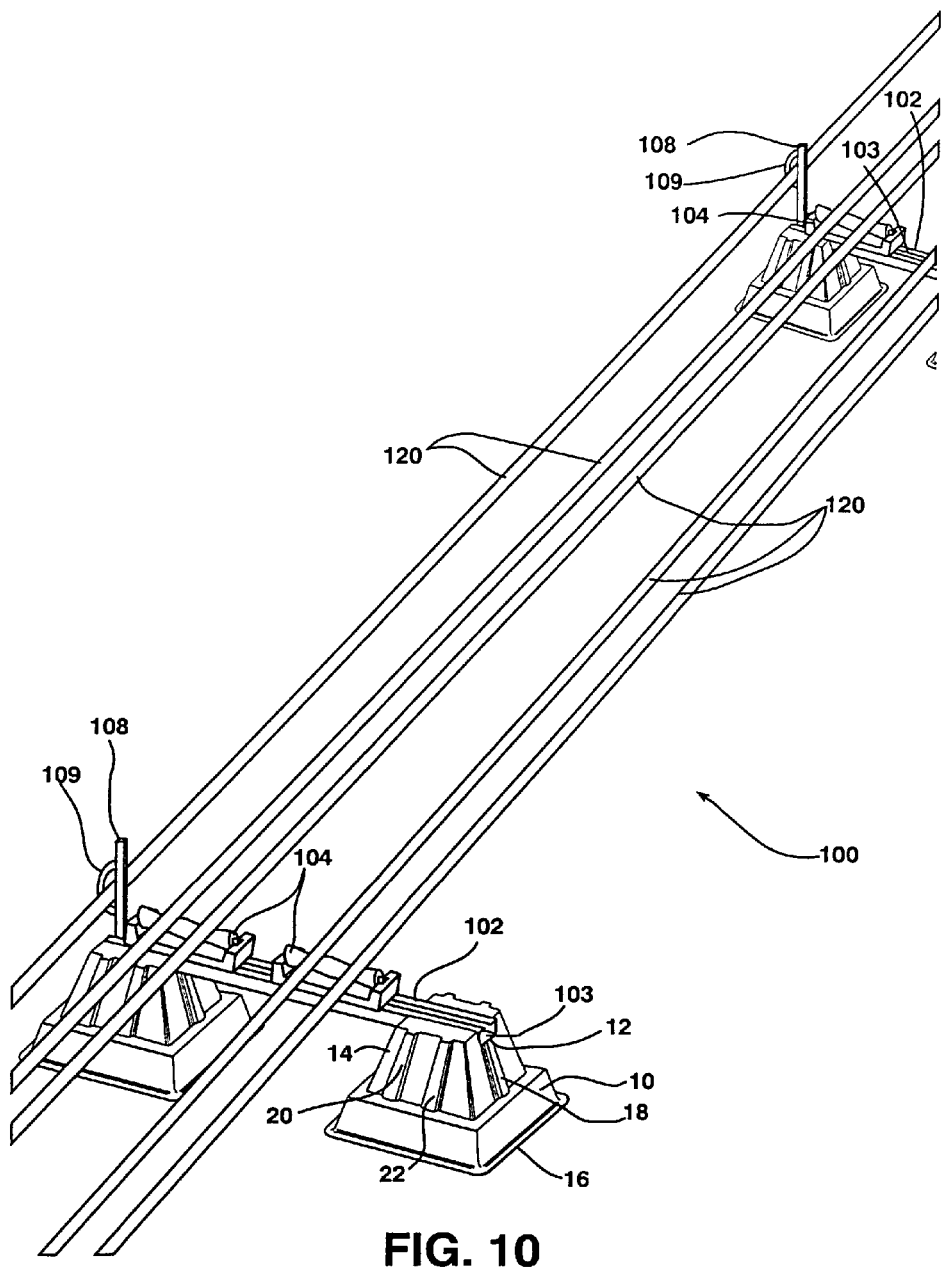
FIG. 10 is a perspective view of the entire system of the preferred embodiment of the present invention in an assembled configuration.

FIG. 10 shows one possible combination of the various elements of the system 100 of the present invention in use. While the preferred embodiment of the present invention is shown, it is to be understood that the invention can be variously configured to be utilized and would still function within the scope of the present invention. This includes embodiments where the device can rotate and stack in various lengths, while in the preferred embodiment it is two inches. This embodiment allows the device to carry more than one pipe and can be used with or without the strut track that runs in between. In addition to being stacked, these devices can be glued together for additional support, saddle step into the strut and provide side pressure on the pipe.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

We claim:

1. A system for supporting at least one pipe; said system comprising:
   a first support block, said first support block having a body, said body defining a channel positioned within an upper portion of said first support block, said first support block being generally hollow and defining an internal cavity therein, said internal cavity configured to receive an upper portion of a second support block therein;
   a second support block, said second support block having a body, said body defining a channel positioned within said upper portion of said second support block, said second support block being generally hollow and defining an internal cavity therein, said internal cavity configured to receive said upper portion of said first support block therein;
   said internal cavity of said first support block and said upper portion of said second support block configured so that when said first support block is stacked in a first orientation over said second support block, said first support block and said second support block are stacked in a nested together configuration;
   said internal cavity of said first support block and said upper portion of said second support block configured so that when said first support block is stacked in a second orientation over said second support block said first support block and said second support block are stacked in a vertically spaced configuration;
   a support rail, said support rail received into said first support block channel, said support rail defining a track configured to allow the permanent attachment of said support rail to said channel of said first support block through a connection means; and
   an adapter configured to fit within said track, said adapter having a first portion configured to attach to said track and a second portion configured to connect with a conduit.

2. The system of claim 1 wherein said second portion of said adapter is a roller, connected to said adapter in such a manner so as to allow free rotation of said roller within said adapter.

3. The system of claim 1 wherein said second portion of said adapter is a stationary adapter having at least one portion configured to hold a portion of a pre-selected sized piece of conduit therein.

4. The system of claim 1 wherein said first portion of said adapter is configured to snap fit within said track.

5. The system of claim 1 further comprising a selectively attachable riser bar configured for connection to said upper portion of said first support block.

6. The system of claim 1 wherein said second support block further comprises at least two generally vertically oriented projections, said generally vertically projections configured to stabilize said first and second support blocks when said first and second support blocks are positioned in said spaced stacked orientation.

7. The system of claim 1 wherein said first and second support blocks are manufactured of a high density UV resistant plastic material.

8. The system of claim 1 wherein said second support block has a first set of support ribs and a second set of support ribs, said first set of support ribs configured to stabilize said first and second support blocks in a first direction when stacked together, and said second set of support ribs configured to stabilize said first and second support blocks in a second direction when stacked together.

9. The system of claim 1 wherein said first support block comprises a base, said base being larger than said first support block upper portion, and wherein said second support block comprises a base, said base being larger than said second support block upper portion.

10. A support block system for supporting at least one pipe; said support block system comprising:
   a first support block and a second support block, each support block comprising, a body, said body comprised of a base and an upper portion, each support block having a generally tapered configuration wherein said base covers a larger area than said upper portion, said upper portion further defining a channel positioned within said upper portion, said channel configured to receive a support rail therein;
   each support block being generally hollow and defining an internal cavity therein, said internal cavity configured to receive said upper portion of the other support block therein, said internal cavity of said first support block and said upper portion of said second support block configured so that when said upper portion is received within said internal cavity in a first orientation said first support block and said second support block nest together and when said upper portion is received within said internal cavity in a second orientation, said first and second support blocks are positioned together in a vertically spaced orientation; and
   said support blocks each further comprising at least two generally vertically oriented projections, said generally vertically projections configured to stabilize said support blocks when said support blocks are positioned in said vertically spaced orientation.

11. The support block system of claim 10 wherein said support blocks each further comprise at least two additional generally vertically oriented projections, said generally vertically oriented projections configured to stabilize said support blocks when said support blocks are positioned in said vertically spaced orientation.

12. The support block system of claim 11 wherein said support blocks each further comprise at least one generally horizontally oriented projection, said generally horizontally oriented projection configured to interact with said inner portion of the other block so as to hold said support blocks in said vertically spaced orientation.

* * * * *